United States Patent
Kawabata

[11] Patent Number: 6,144,451
[45] Date of Patent: *Nov. 7, 2000

[54] MULTIPLE POINTS DISTANCE MEASURING APPARATUS

[75] Inventor: Takashi Kawabata, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/845,286

[22] Filed: Apr. 21, 1997

Related U.S. Application Data

[63] Continuation of application No. 08/359,835, Dec. 20, 1994, abandoned.

[30] Foreign Application Priority Data

Dec. 22, 1993 [JP] Japan .................................. 5-325431

[51] Int. Cl.$^7$ ................................................... G01B 11/14
[52] U.S. Cl. ......................................................... 356/375
[58] Field of Search ............................... 356/2, 375, 376; 250/201.8, 201.7, 201.2, 201.4; 354/406–408, 402; 396/128, 125; 382/254, 154, 309; 348/246, 247, 295, 230

[56] References Cited

U.S. PATENT DOCUMENTS

| | | |
|---|---|---|
| 4,253,120 | 2/1981 | Levine . |
| 4,496,832 | 1/1985 | Sakai et al. . |
| 4,582,424 | 4/1986 | Kawabata . |
| 4,749,848 | 6/1988 | Sorimachi . |
| 4,792,668 | 12/1988 | Akashi et al. .................. 250/201.2 |
| 4,858,013 | 8/1989 | Matsuda . |
| 5,093,562 | 3/1992 | Okisu et al. .................. 250/201.8 |
| 5,121,151 | 6/1992 | Kawabata et al. .................. 354/402 |
| 5,155,347 | 10/1992 | Nishibe .................. 250/201.8 |
| 5,241,167 | 8/1993 | Suzuki et al. .................. 250/201.8 |
| 5,381,175 | 1/1995 | Sudo et al. . |
| 5,428,420 | 6/1995 | Akashi et al. . |

FOREIGN PATENT DOCUMENTS 60-15506  1/1985  Japan .

*Primary Examiner*—K. P. Hantis
*Attorney, Agent, or Firm*—Fitzpatrick, Cella, Harper & Scinto

[57] ABSTRACT

A focusing state detecting or distance measuring apparatus or camera which measures a focusing state or distance of an object for a plurality of different areas in a scene. The apparatus or camera includes a light receiver for receiving a light beam associated with each area associated in the scene at a light receiving portion corresponding to each area. Each light receiving portion has a plurality of elements and provides an output corresponding to the received light. The apparatus also includes a processing circuit for performing calculation and regulation functions. When performing a calculation function, the circuit performs a correlation calculation on an output of each of the light receiving portions to detect a focusing state or distance for each light receiving portion. When performing a regulation function, the circuit sets a range of elements of each light receiving portion whose outputs are subject to the correlation calculation When the correlation calculation is to be performed at a particular light receiving portion and the correlation calculation at an other light receiving portion has already been performed, the circuit sets the range elements of the particular light receiving portion whose outputs are subject to the correlation calculation based on the result of the correlation calculation for the other light receiving portion.

13 Claims, 6 Drawing Sheets

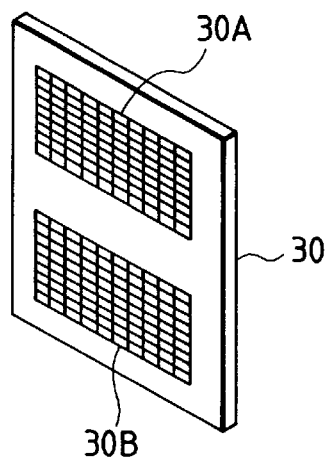
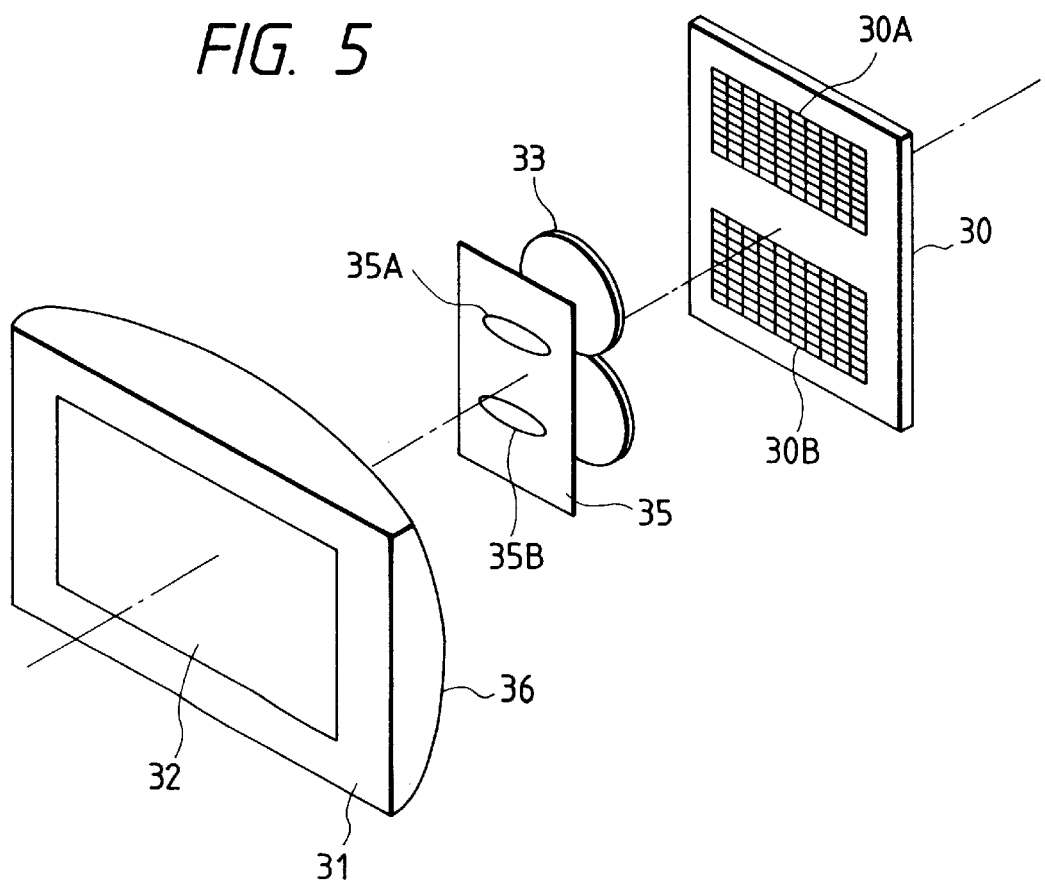

MULTIPLE POINTS DISTANCE MEASURING APPARATUS

This application is a continuation of Application Ser. No. 08/359,835 filed Dec. 20, 1994, now abandoned.

BACKGROUND OF THE INVENTION

1. Field of the Invention

The present invention relates to a multiple points distance measuring or focusing state detecting apparatus of a camera using an area sensor, etc.

2. Related Background Art

Conventionally, there have been cameras which measure distances to 3–5 discrete points. Also, there have been video cameras or the like which use a wide distance-measuring area sensor to measure a distance for feature points therein. Furthermore, there have been robots or the like which use a multiple points distance measuring apparatus for environmental recognition.

According to the conventional devices, since a distance has been measured for multiple discrete points, a distance has been measured in detail for each point, and then distance measurement values have been rounded and selected by information processing.

Also, in environmental recognition, a detailed measurement has been needed for points of different distances because these points are taken as feature points representing an obstruction or a body of a dissimilar material (gloss) and hence cannot be ignored.

Multiple points distance measurement, therefore, has had a drawback of requiring a longer calculation time derived from multiple points.

SUMMARY OF THE INVENTION

One aspect of the application is to provide a multiple points distance measuring or focusing state detecting apparatus which, in executing multiple points distance measurement or focusing state detection, regulates the output range of a sensor to be used in focusing state detecting calculation for a neighboring point of distance measurement when a distance measurement value has been obtained for a certain point of distance measurement (i.e. the output range of a sensor corresponding to the obtained distance measurement value is used).

Another aspect of the application is to provide a multiple points distance measuring or focusing state detecting apparatus which, when a point which cannot be distance measured is involved in multiple points distance measurement or focusing state detection, specifies a distance measurement value for the disabled point in consideration of the results of distance measurement obtained for other points of distance measurement.

Other objects of the present invention will be more apparent from an embodiment which will be described below with refererce to drawings.

BRIEF DESCRIPTION OF THE DRAWINGS

FIG. 4 is a view illustrating the construction of an embodiment of a sensor used in the present invention;

FIG. 5 is a view illustrating the construction of an exemplified focusing state detecting optical system of the present invention;

DETAILED DESCRIPTION OF THE PREFERRED EMBODIMENT

Figure 1:
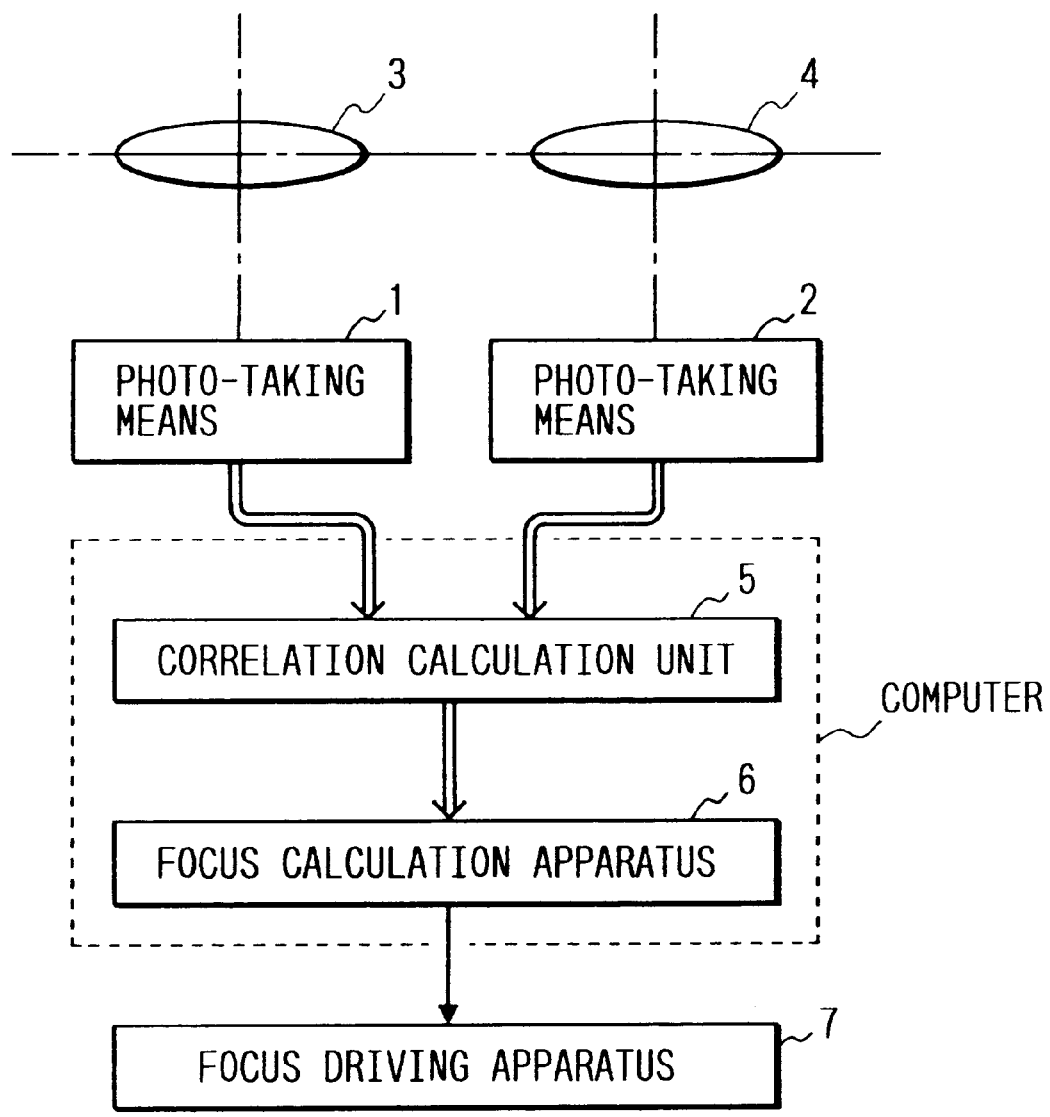
FIG. 1 is an overall block diagram illustrating an embodiment of the present invention.

An embodiment of the present invention is shown in FIG. 1. Lenses 3, 4 are used to form an image of a field on photoelectric conversion elements of photo-taking means 1, 2. Thus, photo-taking signals of two planes are obtained.

A correlation calculation is executed on each of the photo-taking signals of two planes having parallax at a correlation calculation unit 5, thereby obtaining each distance from the relation of correspondence of each pixel of a subject.

A focus calculation apparatus 6 calculates a focus position required for taking a photo from the obtained distances. Then, a focus driving apparatus 7 drives a photo-taking lens to a position required for taking a photo.

In the correlation calculation unit 5, for example, to obtain a distance for one pixel, it is necessary to obtain the relation of correspondence to a picture having parallax for about 10 surrounding pixels. Hence, according to a conventional practice, when calculation covers a total of 10 pixels of dislocation, both forward and backward, 10×10 times of calculations are involved. Accordingly, in the case of a 10×10 screen, 10,000 calculations are needed.

A two-dimensional area sensor disclosed, for example, in U.S. Ser. No. 936,010 is used as the photo-taking means 1, 2.

FIG. 4 shows the area sensor disclosed in U.S. Ser. No. 936,010. In FIG. 4, reference numeral 30 denotes an area sensor. 30A and 30B denote light receiving areas corresponding to the photo-taking means 1 and 2.

In an optical system of FIG. 1, the light of an image is received at light receiving areas 1 (30A) and 2 (30B) through the lenses 3, 4. FIG. 5 shows an example of receiving the light of an image through a single photo-taking optical system. In FIG. 5, reference numeral 31 denotes a visual field mask, which is located near an expected image forming plane of a photo-taking lens (not shown). An area limited by a single wide aperture 32 is a range allowing focus to be detected. 33 denotes a secondary image forming lens, which is preceded by a stop plate 35. Each stop slit 35A, 35B regulates an incident beam on each erect lens of the secondary image forming lens. The stop plate 35 is located such that an image is formed substantially at the position of an exit pupil of the photo-taking lens by a power of a field lens 36.

The secondary image forming lens 33 comprising a pair of erect lenses re-forms an image of a subject determined by the aperture 32 on a pair of light receiving areas 30A and 30B of the area sensor 30. Image-of-subject signals on two light receiving areas 30A and 30B of the area sensor 30 are read out as electrical signals and undergo focusing state detecting calculation in a processing apparatus.

Figure 6A:
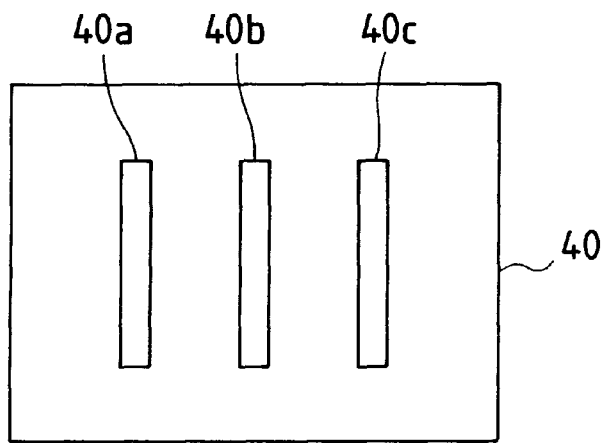
FIGS. 6A and 6B are views illustrating light receiving areas for an image on the sensor of FIG. 5.
Figure 6B:
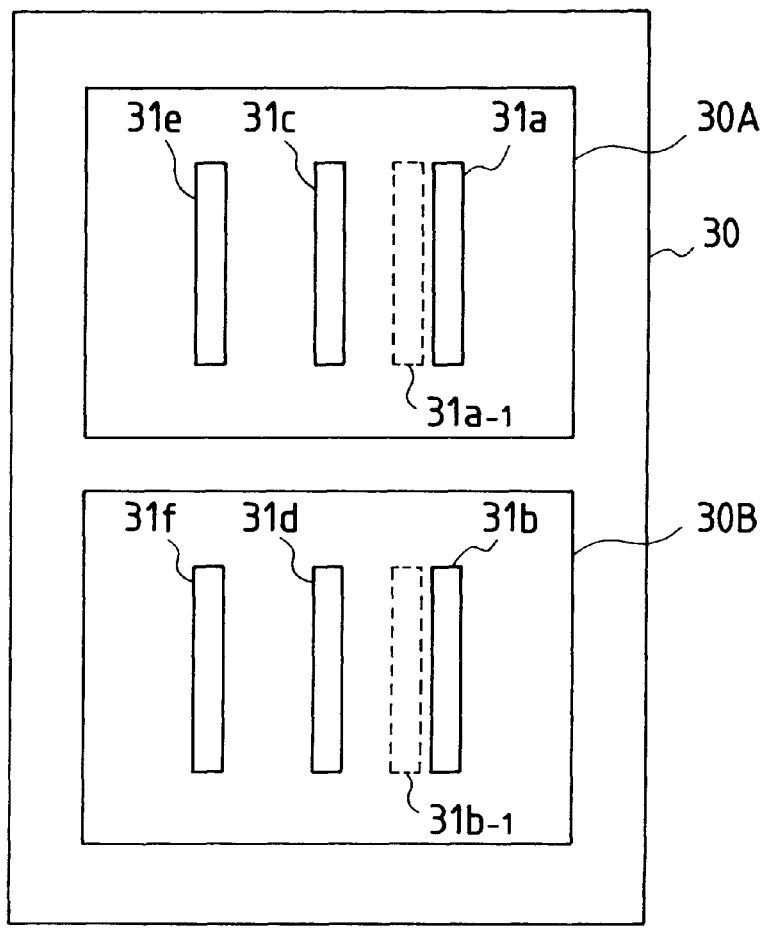

FIGS. 6A and 6B show a photo-taking screen 40 and areas on the area sensor 30 corresponding to those thereon. FIGS. 6A and 6B show three pairs of areas (31a, 31b), (31c, 31d) and (31e, 31f) on the area sensor 30 corresponding to areas 40a, 40b and 40c, respectively, on the photo-taking screen 40. An image at the screen area 40a is light received at sensor areas 31a and 31b, an image at 40b is light received at 31c and 31d, and an image at 40c is light received at 31e and 31f. FIGS. 6A and 6B give an example of three screen areas, but the screen may have more than three areas. In such a case of multiple screen areas, an image is light received at corresponding areas on the sensor.

Figure 7A:
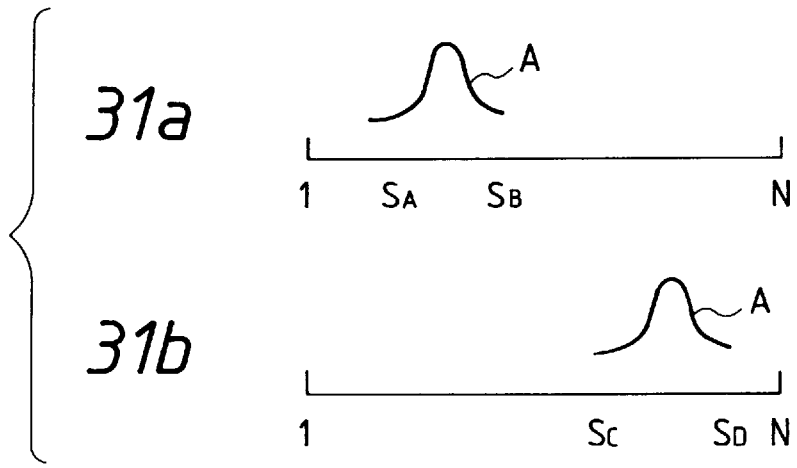
FIGS. 7A and 7B are views illustrating the state of receiving light of an image at the light receiving areas of FIGS. 6A and 6B.
Figure 7B:
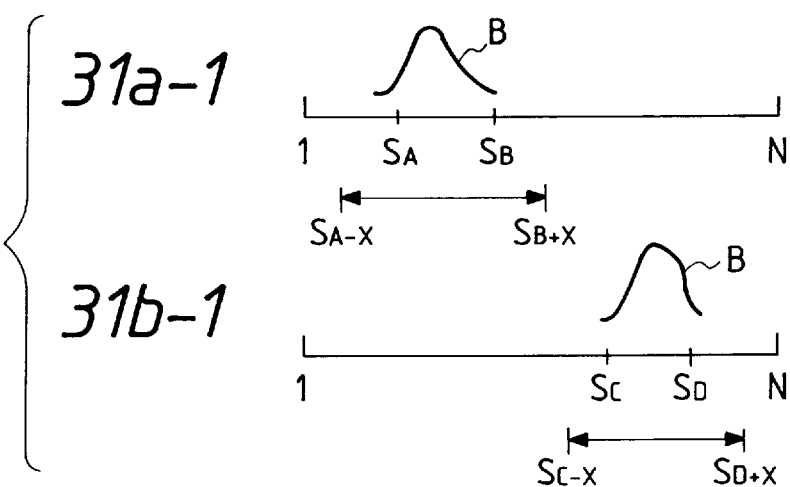

FIGS. 7A and 7B illustrate a calculation range of the correlation calculation unit 5. FIG. 7A shows a range of pixels in sensor areas 31a and 31b. In both sensor areas 31a and 31b, pixels range from 1 to N. The correlation calculation unit 5 determines at what position in the pixel range image A light is received at areas 31a and 31b, by executing correlation calculation while shifting each pixel output of areas 31a and 31b pixel by pixel. Since the correlation calculation itself is well known, a further description thereof is omitted. In this case, it is unknown at what position in the pixel range the image is light received. Hence, the correlation calculation is executed over all the 1-N pixel range. According to a conventional practice, the correlaion calculated has been executed over all the pixel range for each sensor area corresponding to each of a plurality of different distance measuring (focusing state detecting) areas on a screen. As a result, a processing time of calculation has been longer.

The present invention pays attention to the fact that there exist conditions determined by an object of taking a photo. That is, in a photo scene, points at relatively continuous distances are involved in many cases, a point at a unique distance is rarely taken as a subject, and a scattered distant landscape itself like "landscape in view through a small window" is rarely taken as a main subject. Taking these conditions into consideration and assuming that a so-called continuous picture is formed by an area sensor, the present invention simplifies the correlation calculation, thereby making the correlation calculation easily applicable to calculations even for multiple points distance measurement involving further pixels.

In the above example, by referencing a neighboring distance measurement value, the volume of correlation calculation can be reduced by more than half, and thus a processing time can be reduced greatly. Specifically speaking, suppose. that as a result of executing the correlation calculation over all the range of pixels of areas 31a and 31b at the correlation calculation unit 5, it has been found that image A has been light received in a range of pixels $S_A$–$S_B$ and $S_C$–$S_D$ at areas 31a and 31b on the sensor corresponding to a certain area on the screen, as shown in FIG. 7A. At areas on the sensor corresponding to a screen area which neighbors this certain screen area, for example, at $31_{a-1}$ and $31_{b-2}$ (FIG. 6B), it is highly probable that image B is light received at a position near the above light received position at areas 31a and 31b, as shown in FIG. 7B. Hence, at areas $31_{a-1}$ and $31_{b-1}$ which neighbor areas 31a and 31b, the correlation calculation is not executed over all the range of pixels, but only executed on an output in a pixel range of $S_{A-X}$–$S_{B+X}$ and $S_{C-X}$–$S_{D+X}$ which take $S_A$–$S_B$ and $S_C$–$S_D$ (image positions obtained at 31a and 31b) as a center, respectively. As a result, as compared with the case where the correlation calculation is executed on all range of pixels for all areas, the correlation calculation time can be reduced.

Figure 2:
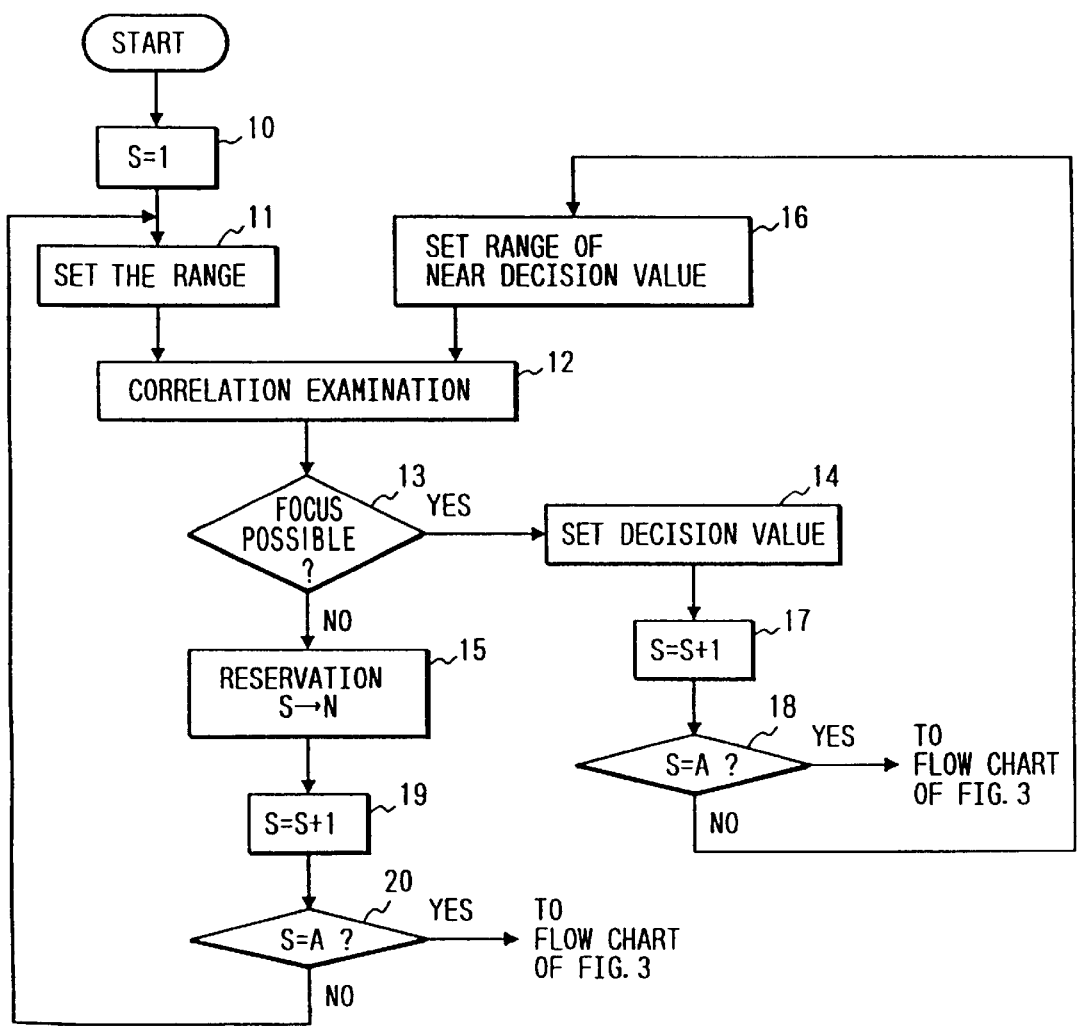
FIG. 2 is a flow chart illustrating operations of the embodiment.

FIG. 2 is a flow chart illustrating the calculation processing which the correlation calculation unit 5 executes for each area. The correlation calculation unit 5 and the focus calculation apparatus 6 comprise a microcomputer and execute processing according to the flow chart of FIG. 2. Operations will now be described with reference to the flow chart of FIG. 2.

At step 10 in FIG. 2, S=1 is set. S is a flag to specify an area to be distance measured (focusing state detected) on a screen. When S=1, a leftmost area on the screen is specified. As an S number increases, an area to be specified is shift right in sequence. At step 11, the range of pixels at an area on a sensor corresponding to the leftmost area specified by S=1, i.e. pixels 1-N in FIG. 7A are set. At step 12, the correlation calculation is executed over the entire range of pixels. The light received position of an image at an area is obtained from a position of a pixel portion which shows a highest correlation value in the results of the correlation calculation. In the case of FIG. 7A, a highest correlation value is obtained when the correlation calculation is executed on an output from pixel portions $S_A$–$S_D$ and $S_C$–$S_N$. Hence, it is determined that the light received position of an image is $S_A$–$S_D$ and $S_C$–$S_D$. At step 13, it is determined from a signal coming from pixels at the above area whether to decide a correlation value indicative, for example, of whether focusing state detection is disabled due to a low contrast or the like, or it is determined whether a correlation value is lower than a predetermined value. If focusing state detection is disabled or if a correlation value is lower than a predetermined value, processing goes to step 15. If it is determined at step 13 to decide a correlation value, processing goes to step 14. At step 14, a focusing state or a distance measurement value is obtained based on a light received position obtained at step 12, thereby making the result of distance measurement (focusing state detection) for an area concerned. At step 17, S=S+1 is performed to specify a neighbor area to the right for distance measurement or focusing state detection. At step 18, whether S=A is determined. If S=A, it is determined that the correlation calculation has been completed for a rightmost area which is specified for distance measurement or focusing state detection. If S=A is not the case, processing goes to step 16. At step 16, an expanded pixel range formed by adding pixel range |x| to the head and end of a pixel range associated with an image position which has been decided at step 14, is taken as a pixel range subjected to the correlation calculation for an area concerned. The correlation calculation is executed on a pixel output in this expanded range. In the aforementioned case, a decided image position for a neighbor area to the left has been $S_A$–$S_B$ and $S_C$–$S_D$. Hence, for a current area, pixel ranges $S_{A-X}$–$S_{B+X}$ and $S_{C-X}$–$S_{B+X}$ are subjected to processing. Subsequently, shifting to a right-hand area in sequence, the above processing is repeatedly executed. During executing the above processing, if it is determined at step 13 that a correlation value is low, data S indicative of the area is input to memory N, and when the correlation calculation is to be executed on a neighbor area at right, step 11 is executed via steps 19 and 20 for calculation over the entire pixel range.

As described above, according to the embodiment of the present invention, when information about a neighbor point is available, processing follows a flow starting from step 16 in FIG. 2. That is, at step 16, information about dislocation of a neighbor point (image position) is expanded in both directions to limit a range for correlation examination to an expanded range. In the above-mentioned scene of taking a photo, distance measurement (focusing state detection) is completed with the limited range in many cases, and processing goes to step 14 where a decision value is to be set.

Of course, there is a case where a distant subject (portion) is involved. In such a case, distance measurement (focus detection) for the point is reserved as at step 15.

This is intended to handle a case where it depends on the order of pixels for dislocation search (correlation calculation), but a distant point is similar in distance measurement value to a pixel in an uncalculated portion. For example, when a left-hand subject is at a middle distance and a right-hand subject is at a far distance and also when correlation is calculated for pixels which have been scanned in sequence from upper left, a distance measurement value will change at the middle of every line (i.e. at a position equivalent to the boundary of the distance). As a result, an advantage of limiting a range of calculation becomes less effective.

In such a case, according to the embodiment, a range of distance measuring calculation is limited to a middle distance for the left-hand subject at a middle distance, and then a range of distance measuring calculation is limited to a far distance for a remaining reserved portion. Thus, the advantage of limiting a range of calculation is fully utilized.

Figure 3:
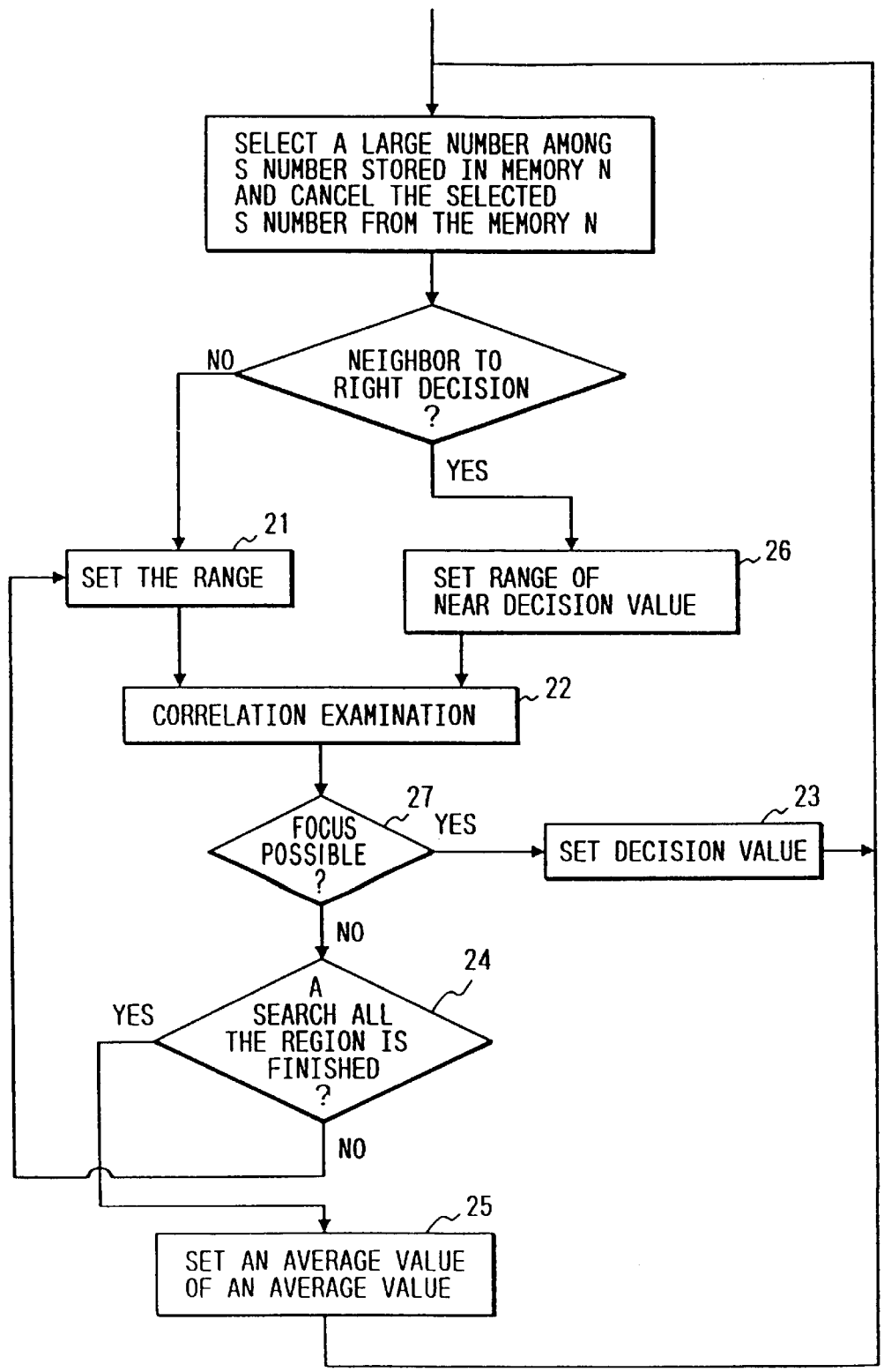
FIG. 3 is a flow chart illustrating operations of the embodiment together with FIG. 2.

This will be described in the flow of processing of FIG. 3. After scanning from a left-hand area has all been completed in FIG. 2, scanning (correlation calculation) from a right-hand area is executed along the flow of FIG. 3 for those points which have been reserved at step 15. For the reserved points which have been input to a memory at step 15, scanning starts from a rightmost area and proceeds in sequence to a left-hand area. Hence, if a neighboring area at the right of a specified reserved point is not decided, correlation is examined at step 22 for the entire range of distance as at step 21. Then, when a distance measurement value is decided, the decided distance measurement value (detected focus value) is set at step 23.

When it is determined at step 27 that a distance measurement value is not decided due to a low correlation value in processing at step 22 and also when a pixel range has been searched for an area concerned, an average value of those detected focus values (distance measurement values) which have been decided for neighboring areas of the area concerned is set as a detected focus value (distance measurement value) for the area concerned at step 25.

This practice is based on an idea different from the one of executing an accurate distance measurement. That is, this practice is based on an idea that when a distance measurement value is far from the rest or undecided for an isolated pixel, a photo focused as a whole is preferable to a photo focused on such an isolated point. Thus, when a distance measurement value is undecided for an isolated point, a neighboring distance measurement value is used for the isolated point.

Also, when a distance measurement value is decided for a neighbor area at the right of a specified area (known neighbor point), a distance range near (similar to) the decided distance measurement value is set for limitation to the range as at step 16 of FIG. 2 (an expanded pixel range with respect to a decided image position for the right-hand area is set). Then, correlation is examined (calculated) at step 22. If a detected focus value (distance measurement value) is decided, the decision value is set at step 23. If undecided, it is highly likely that the range of search is inadequate. Accordingly, branching at step 24 is so made that correlation is re-examined (re-calculated) for the specified area over all range (step 21).

As described above, by trying "simplified calculation utilizing similarity" from a different direction for a reserved portion of FIG. 2, calculation can be simplified even when a plurality of similar distances are involved.

What is claimed is:

1. A focusing state detecting or distance measuring apparatus which measures a focusing state or a distance of an object for a plurality of different areas in a scene, said apparatus comprising:

light receiving means having a plurality of light receiving portions, each light receiving portion corresponding to a respective one of the plurality of different areas in the scene and receiving a light beam associated with that area, each light receiving portion having a plurality of elements and providing an output corresponding to the received light; and a processing circuit for performing calculation and regulation functions, said processing circuit, when performing the calculation function, obtaining a focusing state or a distance associated with each of the plurality of different areas by a calculation on an output of each respectively corresponding light receiving portion, and, when performing the regulation function, setting a range of elements of each light receiving portion whose outputs are subject to the calculation of the calculation function, wherein, when the calculation is to be performed at a certain light receiving portion and the calculation at another light receiving portion has already been performed, said processing circuit sets the range of elements of the certain light receiving portion whose outputs are subject to the calculation based on the result of the calculation for the another light receiving portion.

2. An apparatus according to claim 1, wherein the another light receiving portion is a portion which neighbors the certain light receiving portion.

3. A focusing state detecting or distance measuring apparatus which measures a focusing state or a distance of an object for a plurality of different areas in a scene, said apparatus comprising:

light receiving means having a plurality of light receiving portions, each light receiving portion corresponding to a respective one of the plurality of different areas in the scene and receiving a light beam associated with that area, each light receiving portion comprising a first light receiving part and a second light receiving part, each of said first and second light receiving parts comprising a plurality of pixels; and a processing circuit for performing calculation and regulation functions, said processing circuit, when performing the calculation function, performing a correlation calculation between a plurality of pixel outputs output from the pixels of the first light receiving part and a plurality of pixel outputs output from the pixels of the second light receiving part, for each light receiving portion and obtaining a focusing state or distance associated with each of the plurality of different areas respectively by the correlation calculation for each respectively corresponding light receiving portion, and said processing circuit, when performing the regulation function, setting a range of pixels of each light receiving portion whose outputs are subject to the correlation calculation of the calculation function, wherein, when the correlation calculation is to be performed at a certain light receiving portion and the correlation calculation at another light receiving portion has already been performed, said processing circuit sets the range of pixels of the certain light receiving portion whose outputs are subject to the correlation calculation, based on the result of the correlation calculation for the another light receiving portion.

4. An apparatus according to claim 3, wherein the another light receiving portion is a portion which neighbors the certain light receiving portion.

5. A focusing state detecting or distance measuring apparatus which measures a focusing state or a distance of an object for a plurality of different areas in a scene, said apparatus comprising:

light receiving means having a plurality of light receiving portions, each light receiving portion corresponding to a respective one of the plurality of different areas in the scene and receiving a light beam associated with that area, each light receiving portion comprising a plurality of pixels which provide outputs corresponding to the received light; and a processing circuit for performing a calculation processing operation on the plurality of pixel outputs output from the pixels of each light receiving portion, for obtaining a focusing state or a distance associated with each of the plurality of different areas by the calculation for each respectively corresponding light receiving portion and for determining a focusing state or distance associated with a light receiving portion whose output is insufficient for the calculation processing operation, based on a focusing state or distance obtained for a light receiving portion neighboring the insufficient light receiving portion.

6. An apparatus according to claim 5, wherein said processing circuit obtains an average value of a focusing state or distance value from a plurality of light receiving portions neighboring the insufficient light receiving portion.

7. A focusing state detecting or distance measuring apparatus which measures a focusing state or a distance of an object for a plurality of different areas in a scene, said apparatus comprising:

light receiving means having a plurality of light receiving portions, each light receiving portion corresponding to a respective one of the plurality of different areas in the scene and receiving a light beam associated with that area, each light receiving portion comprising a plurality of pixels providing outputs corresponding to the received light; and a processing circuit for performing a calculation processing operation on the plurality of pixel outputs output from the pixels of each light receiving portion, for obtaining a focusing state or distance associated with each of the plurality of different areas by the calculation for each respectively corresponding light receiving portion and for determining a focusing state or distance associated with a light receiving portion whose output is insufficient for the calculation processing operation, based on a focusing state or a distance obtained for a light receiving portion different from the insufficient light receiving portion.

8. Apparatus according to claim 7, wherein said different light receiving portion is disposed in proximity to said insufficient light receiving portion.

9. A camera having a focusing state detecting or distance measuring apparatus which measures a focusing state or a distance of an object from the camera for a plurality of different areas in a scene, said apparatus comprising:

light receiving means having a plurality of light receiving portions, each light receiving portion corresponding to a respective one of the plurality of different areas in the scene and receiving a light beam associated with that area, each light receiving portion having a plurality of elements and providing an output corresponding to the received light; and a processing circuit for performing calculation and regulation functions, said processing circuit, when performing the calculation function, obtaining a focusing state or a distance associated with each of the plurality of different areas by a calculation on the output of each respectively corresponding light receiving portion, and when performing the regulation function, setting a range of elements of each light receiving portion whose outputs are subject to the calculation of the calculation function, wherein, when the calculation is to be performed at a certain light receiving portion and the calculation at another light receiving portion has already been performed, said processing circuit sets the range of elements of the certain light receiving portion whose outputs are subject to the calculation based on the result of the calculation for the another light receiving portion.

10. A camera having a focusing state detecting or distance measuring apparatus which measures a focusing state or a distance of an object from the camera for a plurality of different areas in a scene, said apparatus comprising:

light receiving means having a plurality of light receiving portions, each light receiving portion corresponding to a respective one of the plurality of different areas in the scene and receiving a light beam associated with that area, each light receiving portion comprising a plurality of pixels providing outputs corresponding to the received light; and a processing circuit for performing a calculation processing operation on a plurality of pixel outputs output from the pixels of each light receiving portion, for obtaining a focusing state or a distance associated with each of the plurality of different areas by the calculation for each respectively corresponding light receiving portion, and for determining a focusing state or distance for a light receiving portion whose outputs are insufficient for the calculation processing operation, based on a focusing state or a distance obtained for a light receiving portion different from the insufficient light receiving portion.

11. A focusing state detecting or distance measuring apparatus which measures a focusing state or a distance of an object for a plurality of different areas in a scene, said apparatus comprising:

light receiving means having a plurality of light receiving portions, each receiving portion corresponding to a respective one of the plurality of different areas in the scene and receiving a light beam associated with that area, each light receiving portion comprising a plurality of pixels providing outputs corresponding to the received light; and a processing circuit for performing a calculation processing operation on the plurality of pixel outputs output from the pixels of each light receiving portion, for obtaining a focusing state or distance associated with each of the plurality of different areas by the calculation for each respectively corresponding light receiving portion and for determining a focusing state or distance associated with a light receiving portion which is in a state in which detection of an appropriate focusing state or distance by the calculation processing operation is disabled, based on a focusing state or distance obtained for a light receiving portion different from the light receiving portion which is in the state in which detection of an appropriate focusing state or distance by the calculation processing operation is disabled.

12. A focusing state detecting or distance measuring apparatus which measures a focusing state or a distance of an object for a plurality of different areas in a scene, said apparatus comprising:

light receiving means having a plurality of light receiving portions, each receiving portion corresponding to a respective one of the plurality of different areas in the scene and receiving a light beam associated with that area, each light receiving portion comprising a plurality of pixels providing outputs corresponding to the received light; and a processing circuit for performing a calculation processing operation on the plurality of pixel outputs output from the pixels of each light receiving portion, for obtaining a focusing state or distance associated with each of the plurality of different areas by the calculation for each respectively corresponding light receiving portion and for determining a focusing state or distance associated with a light receiving portion which is in a state in which a focusing state or distance is not decided by the calculation processing operation, based on a focusing state or distance obtained for a light receiving portion different from the light receiving portion which is in the state in which a focusing state or distance is not decided by the calculation processing operation.

13. An apparatus according to claim 12, wherein the focusing state or distance is not decided due to a correlation value being less than a predetermined value.

* * * * *

UNITED STATES PATENT AND TRADEMARK OFFICE
CERTIFICATE OF CORRECTION

PATENT NO. : 6,144,451

DATED : November 7, 2000

INVENTOR(S): TAKASHI KAWABATA

It is certified that error appears in the above-identified patent and that said Letters Patent is hereby corrected as shown below:

ON THE COVER PAGE, AT [57] IN THE ABSTRACT:
Line 16, "calculation" should read --calculation..--.
Line 19, "an other" should read --another--.

COLUMN 5:
Line 59, "all" should read --the entire--.

Signed and Sealed this

Twenty-ninth Day of May, 2001

Attest:

NICHOLAS P. GODICI

*Attesting Officer*      *Acting Director of the United States Patent and Trademark Office*